United States Patent [19]

Hara et al.

[11] Patent Number: 5,078,316

[45] Date of Patent: Jan. 7, 1992

[54] CONTROL SYSTEM FOR AUTOMOTIVE AIR CONDITIONER

[75] Inventors: Junichiro Hara; Hideo Takahashi; Yuji Ishihara, all of Kanagawa, Japan

[73] Assignee: Nissan Motor Company, Limited, Japan

[21] Appl. No.: 521,681

[22] Filed: May 10, 1990

[30] Foreign Application Priority Data

May 10, 1989 [JP] Japan .................................. 1-116256

[51] Int. Cl.$^5$ .............................................. F24F 7/00
[52] U.S. Cl. .................................. 236/49.3; 236/94; 454/75
[58] Field of Search .................. 236/49.3, 91 R, 91 C, 236/91 E, 91 F, 91 D, 94; 62/161, 162, 163, 164; 165/24, 25, 11.1; 98/2.01

[56] References Cited

U.S. PATENT DOCUMENTS 4,858,824 8/1989 Matsuda et al. ...................... 236/94
4,914,925 4/1990 Umemura et al. .................. 165/11.1
4,938,033 7/1990 Ogihara et al. ...................... 98/2.01

Primary Examiner—Harry B. Tanner
Attorney, Agent, or Firm—Lowe, Price, LeBlanc & Becker

[57] ABSTRACT

A control system adjusts the active state of an air conditioner system for automotive vehicles on the basis of the thermal environment in accordance with an automatic operation setting program. When a user inputs a modification request for adjusting the thermal environment within a vehicular cabin by means of a button switch while the air conditioner system operates in accordance with the program, the control system modifies the active state of the air conditioner system on the basis of the user's modification requests and the present thermal environment. The active state modification values are stored in a memory to be used in the adjustment of the active state until new modification values are entered by the user.

25 Claims, 7 Drawing Sheets

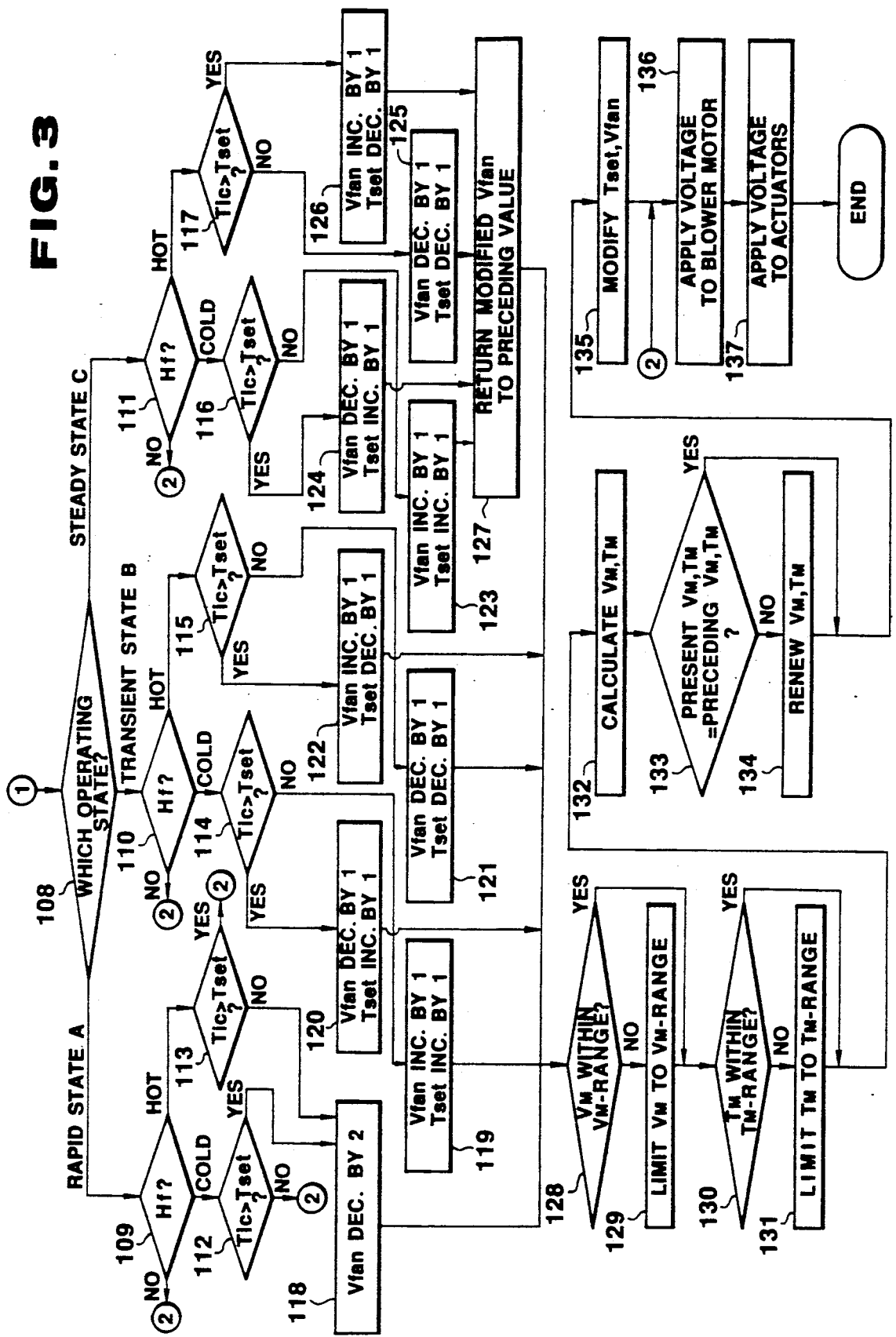

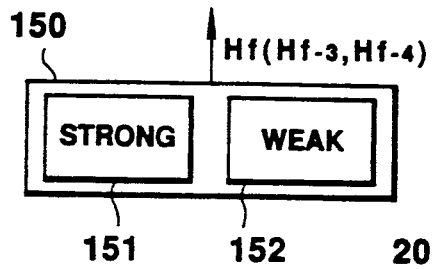
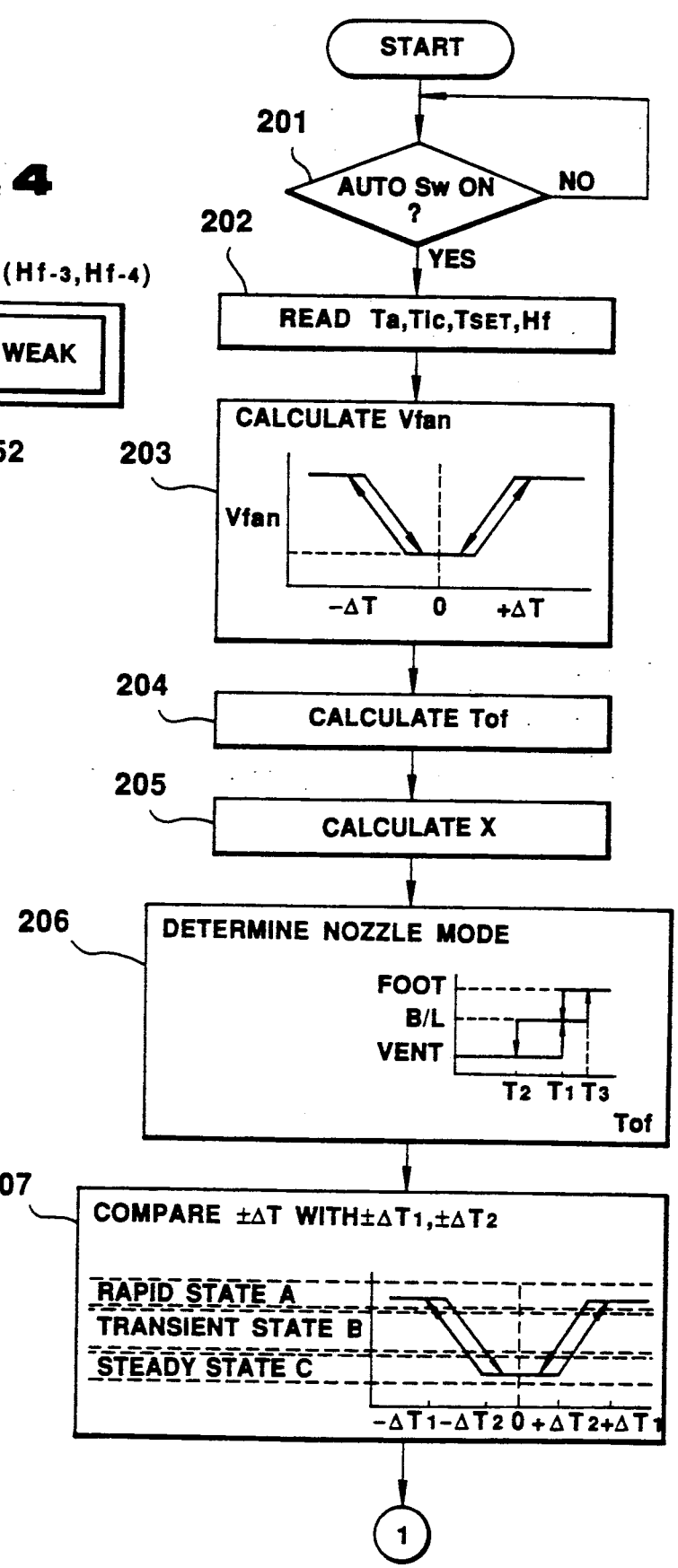

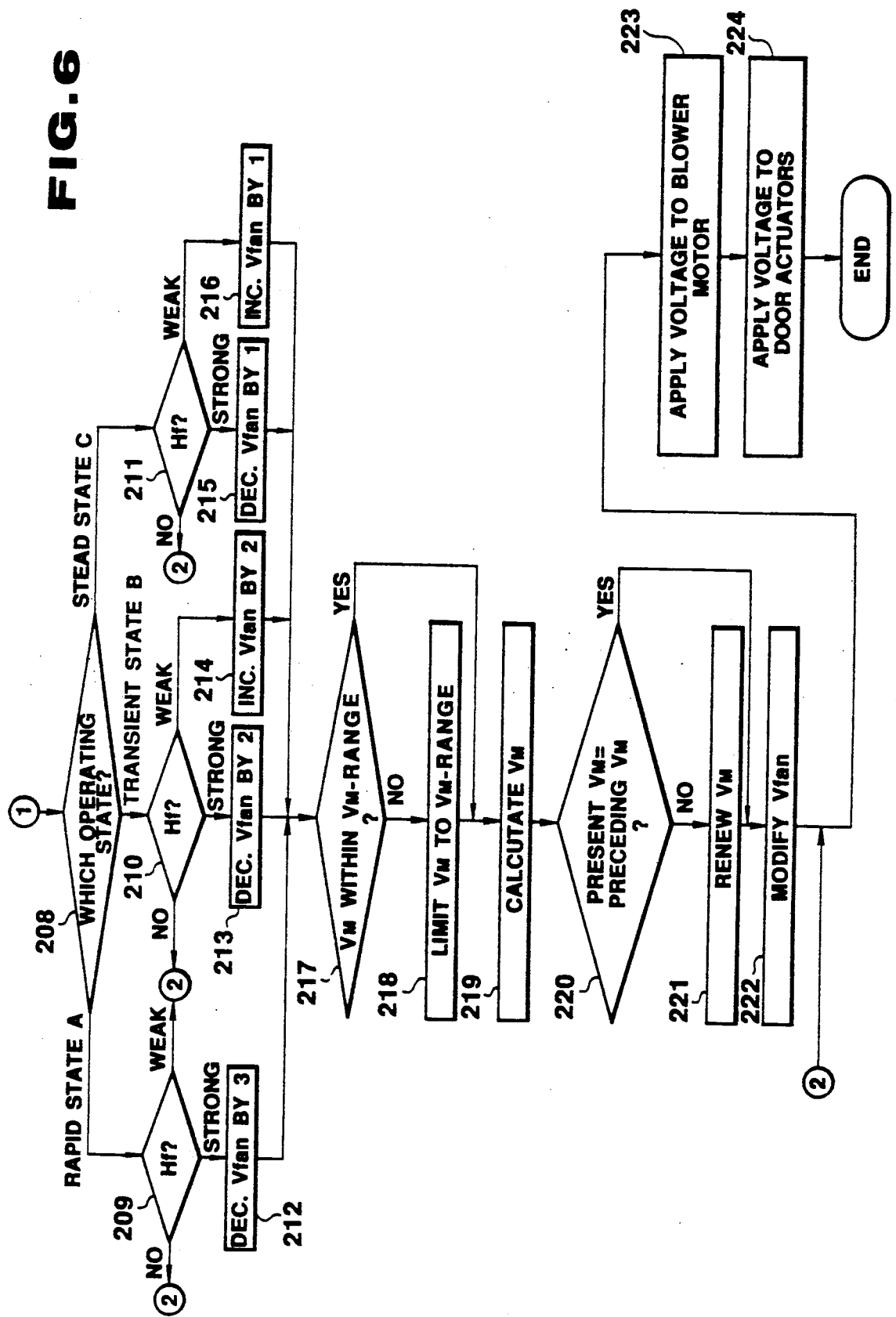

CONTROL SYSTEM FOR AUTOMOTIVE AIR CONDITIONER

BACKGROUND OF THE INVENTION

1. Field of The Invention

The present invention relates generally to a control system for an automotive air conditioner which can automatically control the conditioning parameters (active state) thereof depending upon the thermal environment in the vehicular cabin. More specifically, the invention relates to an air conditioner system in which the user can further adjust the conditioning parameter(s) while the system performs its automatic operation.

2. Description of The Prior Art

Automatic air conditioner systems which automatically control the thermal environment in a vehicular cabin so as to establish a required thermal environment in accordance with a cabin temperature preset by a vehicle occupant are well known in the art. The thermal environment of the vehicle cabin is determined by a cabin temperature detected by a cabin temperature sensor installed in the vehicular cabin, the magnitude of insolation detected by an insolation sensor installed on the vehicular body, an ambient temperature detected by an ambient temperature sensor installed on the vehicular body, and so forth.

Such automatic air conditioner systems are described in Japanese Patent First (unexamined) Publications (Tokkai Sho.) Nos. 56-116513 and 57-130813. These systems include a voice interactive control unit which comprises a microcomputer and which announces a set cabin temperature by voice and adjusts the set cabin temperature in response to a spoken command by a user without operating a lever, dial or the like.

However, this system is not capable of fine adjustment according to the subjective opinion of the user, that is, if the user feels "too hot" or "too cold" under a particular thermal environment, he/she must quantify his/her feeling as a set cabin temperature on the basis of his/her past experience and manually or vocally input a quantified cabin temperature numerically. For example, if the present set cabin temperature is 25° C. and the actual cabin temperature is about 25° C., the user may reset the set cabin temperature to 23.5° C. if he/she feels "slightly hot", or reset the latter to be 20° C. if he/she feel "very hot". In such systems, a user unaccustomed to the operation of such an air conditioner system can not easily communicate a desired temperature to the system.

SUMMARY OF THE INVENTION

It is therefore a principal object of the present invention to eliminate the aforementioned disadvantages and to provide an air conditioner system which can modify the target active state thereof to change a cabin thermal environment according user input. The target active state being the present condition of all adjustable parameters in the air conditioner system.

It is another object of the invention to provide an air conditioner system which can further finely adjust the target active state set by the user in response to slight changes in the active state which may be desired by the user.

In order to accomplish the aforementioned and other objects, the air conditioner system includes means for modifying the target active state of the air conditioner system between the present target active state thereof and a target different active state which may be desired by a user, in regard to the thermal environment within a vehicular cabin.

According to one aspect of the present invention, an air conditioner system for an automotive vehicle comprises:

- air passage means defining an air path and including an outlet which opens into a vehicular cabin for discharging conditioned air into the vehicular cabin;
- air conditioning means for generating conditioned air of a desired temperature to be discharged into the vehicular cabin;
- temperature setting means for allowing setting of a desired temperature of conditioned air within the vehicular cabin to produce a first signal representative of the set cabin temperature;
- detecting means for monitoring a thermal environment within and outside the vehicular cabin to produce a second signal representative thereof;
- first control means, associated with the air conditioning means, for setting the target active state of the air conditioner system depending upon the relationship between the first and second signal values;
- condition discriminating means for determining the present operative state of the air conditioner system on the basis of the relationship between the first and second signal values to produce a third signal representative of the present active state;
- input means for inputting a modification request request for adjusting the thermal environment within the vehicular cabin to produce a fourth signal representative of the request; and
- second control means associated with the first control means, for permitting adjusting the target active state of the air conditioner system on the basis of the relationship between the third and fourth signal values.

The first control means may adjust flow rate of conditioned air and the temperature of the conditioned air to be discharged into the vehicular cabin. The input means may receive a modification request for adjusting temperature within the vehicular cabin. In this case, the second control means may modify the flow rate of conditioned air and/or the set cabin temperature. Alternatively, the input means may receive a modification request for adjusting the flow rate of conditioned air. In this case, the second control means preferably modifies only the flow rate of conditioned air.

The air conditioner system may further includes memory means for storing the modification request,; value and the first control means may adjust the target active state of the air conditioner system by the modification value.

The detecting means may monitor temperature within the vehicular cabin, ambient temperature outside the vehicular cabin, and the magnitude of insolation to produce sensor signals representative of the detected cabin temperature, the ambient temperature and the magnitude of insolation. The first control means may adjust the flow rate of conditioned air on the basis of the difference between the detected cabin temperature and the set cabin temperature, and the condition discriminating means may determine the present operative condition of the air conditioner system on the basis of the difference.

According to another aspect of the invention, an air conditioner system for an automotive vehicle comprises:

air passage means defining an air path and including first and second outlets which open into a vehicular cabin for discharging conditioned air into the vehicular cabin;

air conditioning means for generating conditioned air of a desired temperature to be discharged into the vehicular cabin;

setting means for allowing manual setting of a desired temperature of conditioned air within the vehicular cabin to produce a first signal representative of the set cabin temperature;

detecting means for monitoring thermal environment within and outside the vehicular cabin to produce a second signal representative of the detected thermal environment;

first control means, associated with the air conditioning means, for setting the target active condition of the air conditioner system depending upon the relationship between the first and second signal values;

discriminating means for determining the present flow rate ratio of conditioned air discharged from the first air outlet to that from the second air outlet on the basis of the relationship between the first and second signal values to produce a third signal representative of the present flow rate ratio of conditioned air;

modification request input means for allowing a user to request modification of the present ratio of flow rate of conditioned air and to produce a fourth signal representative of the input of the modification request; and second control means, associated with the first control means, for modifying the present flow rate ratio of conditioned air on the basis of the relationship between the third and fourth signal values.

The discriminating means may determine the present flow rate ratio of conditioned air on the basis of the discharge air temperature. The detecting means may monitor temperature within the vehicular cabin, ambient temperature outside the vehicular cabin, and the magnitude of insolation to produce sensor signals representative of the detected cabin temperature, the ambient temperature and the magnitude of insolation. The first control means may adjust the flow rate of conditioned air on the basis of the difference between the detected cabin temperature and the set cabin temperature.

BRIEF DESCRIPTION OF THE DRAWINGS

The present invention will be understood more fully from the detailed description given hereinbelow and from the accompanying drawings of the preferred embodiment of the invention. However, the drawings are not intended to imply limitation of the invention to a specific embodiment, but are for explanation and understanding only.

In the drawings:

FIGS. 2 and 3 are flow charts showing the first preferred embodiment of a process for controlling the air conditioner system of FIG. 1;

FIG. 4 is a schematic view of a modification request input means used for the second preferred embodiment of the air conditioner system of FIG. 1;

FIGS. 5 and 6 are flow charts showing the second preferred embodiment of a process for controlling the air conditioner system of FIG. 1;

DESCRIPTION OF THE PREFERRED EMBODIMENT

Figure 1:
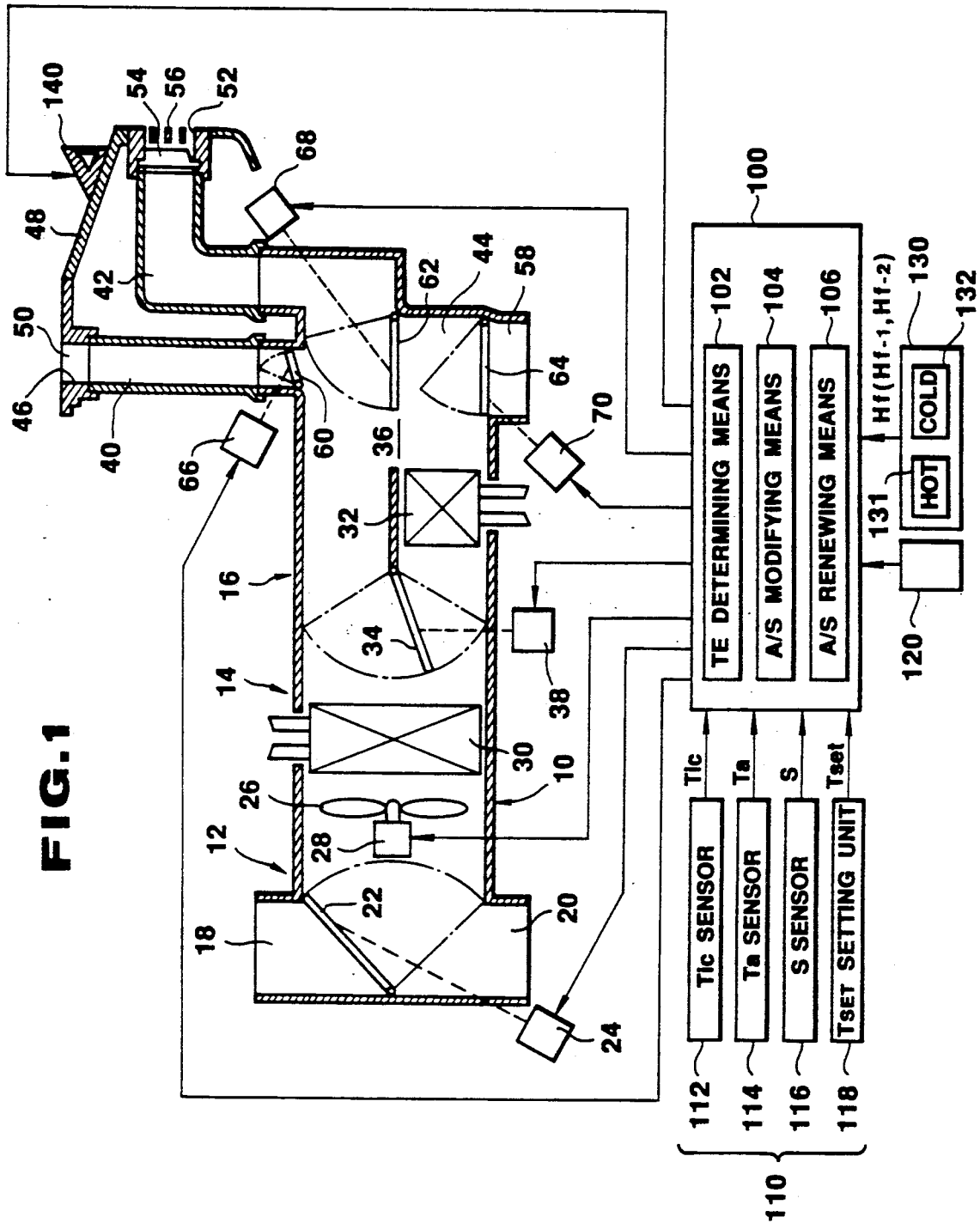
FIG. 1 is a schematic view of the preferred embodiment of an air conditioner system according to the present invention.

Referring now to the drawings, particularly to FIG. 1, the preferred embodiment of an air conditioner system for an automotive vehicle includes a conditioning air duct assembly 10 which comprises a blower housing 12, a cooler unit housing 14 and an air mixing unit housing 16.

The blower housing 12 defines air inlets 18 and 20, The air inlet 18 draws air from the outside of the vehicular body, and will be referred to as a "fresh air inlet". On the other hand, the air inlet 20 draws from the vehicular cabin, and will be referred to as a "recirculation air inlet". The fresh air inlet 18 and the recirculation air inlet 20 are selectively open and closed by means of an air intake door 22 which is hinged on the wall of the blower housing 12. The air intake door 22 is driven by means of an actuator 24 which is controlled by an control unit 100 which will be described hereinafter. By changing the position of the intake door 22, the air conditioner system may selectively operate in a recirculation air mode, a fresh air mode and a half recirculation air mode. In the recirculation air mode, the fresh air inlet 18 is closed by means of the air intake door 22 and the recirculation air inlet 20 is fully opened, so that only the air from the vehicular cabin is introduced into the blower housing 12. On the other hand, in the fresh air door, the recirculation air inlet 20 is closed by means of the air intake door 22 and the fresh air inlet 18 is fully opened, so that only the fresh air is introduced into the blower housing 12. In the half recirculation air mode, the air intake door 22 is positioned at a position between the recirculation air mode position and the fresh air mode position, i.e. both of the fresh air inlet 18 and the recirculation air inlet 20 are open, so that both of the fresh air and the air from the vehicular cabin are introduced into the blower housing 12.

The blower housing 12 also defines a space for receiving a blower 26. The blower 26 is driven by means of a blower motor 28 which is controlled by the control unit 100. The air introduced through the fresh air inlet 18 or the recirculation air inlet 20, is blown against an evaporator 30, which is housed within the cooler unit housing 14, by means of the blower 26. Refrigerant in the evaporator 30 is supplied to a refrigeration cycle comprising a compressor, a condenser, an expansion valve and so forth (not shown). In the conventional manner, the evaporator 30 absorbs heat of the air flow directed from the blower 26 against the evaporator 30, so that the temperature of the air surrounding the evaporator 30, i.e. the temperature of the air flow directed from the blower 26 against the evaporator 30, is decreased.

The air mixing unit housing 16 defines a space for receiving a heater core 32 and an air-mix door 34. The air mixing unit housing 16 houses therein an air-mix chamber 36 at the downstream of the heater core 32. The air flow cooled by the evaporator 30 is blown against the heater core 32. Hot water is supplied to the heater core 32 from a heating cycle comprising a hot-water cock, an expansion valve and so forth (not shown), so that the air flow passing through the heater core 32 is heated, which increases the temperature thereof. The air-mix door 34 is driven by means of an actuator 38 which is controlled by the control unit 100, to pivot around its pivotal axis so as to change its opening angle. In accordance with the opening angle of the air-mix door 34, the proportion of air flow passing through the heater core 32 to that bypassing the latter can be changed. When the air-mix door 34 allows the air cooled by the evaporator 30 to pass through the heater core 32, the temperature of the air introduced into the air-mix chamber 36 is increased. On the other hand, when the air-mix door 34 prevents the air cooled by the evaporator 30 from passing through the heater core 32, the temperature thereof is not increased. Therefore, in accordance with the opening angle of the air-mix door 34, the flow rate of the air passing through the heater core 32 can be changed for adjusting the temperature of the air introduced into the air-mix chamber 36.

The air duct assembly 10 branches downstream of the air-mix chamber 36 into a defroster duct 40, a ventilator duct 42 and a foot duct 44. The defroster duct 40 defines a defroster nozzle 46 arranged on an instrument panel 48 for causing the conditioned air to blow against a front window (not shown). The defroster nozzle 46 is provided with a louver 50 serving as an air-flow direction changing unit. The ventilator duct 42 defines a ventilator nozzle 52 arranged on the instrument panel 48 for causing the conditioned air to blow against the upper half of a vehicular occupant. The ventilator nozzle 52 is also provided with louvers 54 and 56 serving as an air-flow direction changing unit. The foot duct 44 defines a foot nozzle 58 for causing conditioned air to blow against a vehicular occupant's feet. The defroster, ventilator and foot nozzles 46, 52 and 58 are selectively opened and closed by means of a defroster door 60, a ventilator door 62 and a foot door 64, respectively. These doors 60, 62 and 64 are respectively driven by means of actuators 66, 68 and 70 which are controlled by the control unit 100. By changing the positions of these doors 60, 62 and 64, the air conditioner system can operate in various modes, for example, a defroster (DEF) mode in which the defroster door 60 is open with the doors 62 and 64 being closed so that air is discharged from only the defroster nozzle 46, a VENT mode in which the ventilator door 62 is open with the doors 60 and 64 being closed so that air is discharged from only the ventilator nozzle 52, a FOOT mode in which the foot door 64 is open with doors 60 and 62 being closed so that air is discharged from only the foot nozzle 58, and a BI/LEVEL (B/L) mode in which both the ventilator door 62 and foot door 64 are open so that air is discharged from both of the ventilator nozzle 52 and the foot nozzle 58.

The control unit 100 is electrically connected to a thermal environment information input means 110 which provides various kinds of thermal environment information to the control unit 100. The thermal environment information input means 110 includes a cabin temperature sensor ($T_{ic}$ sensor) 112 for monitoring temperature $T_{ic}$ in the vehicular cabin, an ambient temperature sensor ($T_a$ sensor) 114 for monitoring ambient temperature $T_a$ outside of the vehicular cabin, an insolation sensor (S sensor) 116 for monitoring the magnitude of insolation S, and a cabin temperature setting unit ($T_{set}$ sensor) 118 which includes a manual operation switch assembly for manually setting the desired cabin temperature $T_{set}$. These sensors 112, 114 and 116 and the setting unit 118 respectively produce signals indicative of the cabin temperature $T_{ic}$, the ambient temperature $T_a$, the magnitude of insolation S, and the set cabin temperature $T_{set}$, and output these signals to the control unit 100. The manual operation switch assembly of the cabin temperature setting unit 118 is installed on an operation switch panel (not shown) which is arranged in the vehicular cabin. On the operation switch panel, other manual operation switches, such as a blower switch, an intake door mode selecting switch and a nozzle mode selecting switch, which are not shown, are also installed.

The control unit 100 includes a microcomputer. The microcomputer of the control unit 100 has a program which is preset in its memory as a system base and which is executed in response to turning ON of a manual operation setting switch (not shown) or an automatic operation setting switch 120. These setting switches are installed on the operation switch panel, and are manually operable by the user. When the user causes the manual operation setting switch to be turned on, a manual operation program preset in the memory is executed. In accordance with the manual operation setting program, the air conditioner system operates such that the cabin temperature $T_{ic}$ approaches the set cabin temperature $T_{set}$ in the conventional manner. In a case where the air conditioner system operates in accordance with the manual operation setting program, the user can operate the blower switch, the intake door mode selecting switch, the nozzle mode selecting switch and so forth. On the other hand, when the user causes the automatic operation setting switch to be turned on, an automatic operation setting program preset in the memory is executed. In accordance with the automatic operation setting program, the air conditioner system operates such that the thermal environment in the vehicular cabin approaches the preset thermal environment from the present thermal environment as indicated by the sensors, such as the sensed cabin temperature $T_{ic}$, the ambient temperature $T_a$, the magnitude of insolation S and the set cabin temperature $T_{set}$.

In addition to the aforementioned functions which are usually included in automatic air conditioner systems, the air conditioner system according to the present invention has two further functions. One function is that the active state of the air conditioner system may be suitably modified upon a modification request $H_f$ made be the user for adjusting an individual parameter of the active state of the system. Another function is that the active condition modified in response to the modification request is renewed or rewritten in an automatic setting program of the microcomputer. The former is performed by thermal environment determining means (TE determining means) 102 and the active state modifying means (A/S modifying means) 104. The latter is performed by the active state renewing means (A/S renewing means) 106. The thermal environment determining means 102, the required active state modifying means 104 and the required active state renewing means 106 are included in the control unit 100.

The control unit 100 is also electrically connected to modification request input means 130 which is installed in the aforementioned operation switch panel. The modification request input means 130 comprises self-resetting type button switches 131 and 132 for inputting a modification request $H_f$ for adjusting the thermal environment. The self-resetting button switch 131 serves to input a modification request $H_{f\cdot 1}$ indicative of "too hot" for activating when the user feels hot, and the self-resetting type button switch 132 serves to input a modification request $H_{f\cdot 2}$ indicative of "too cold" for activating when the user feels cold. When the user pushes the button switch 131 while the automatic operation setting switch 120 is turned on, an electrical signal corresponding to the modification request $H_{f\cdot 1}$ indicative of "too hot" is output to the control unit 100. On the other hand, when the user pushes the button switch 132, an electrical signal corresponding to the modification request $H_{f\cdot 2}$ indicative of "too cold" is output to the control unit 100.

In addition, the control unit 100 is electrically connected to thermal environment expressing means 140 installed on the instrument panel 48. The thermal environment expressing means 140 is designed to express or voice the user modification request $H_{f\cdot 1}$ or $H_{f\cdot 2}$ indicative of "too hot" or "too cold" which was input to the control unit 100 by the user modification request input means 130, so that the user can visually or aurally confirm the user modification request $H_{f\cdot 1}$ or $H_{f\cdot 2}$ which was input to the control unit 100. The thermal environment expressing means 140 comprises, for example, a liquid crystal display (LCD) device or a speech synthesizer.

The thermal environment determining means 102 and the required active condition modifying means 104 are respectively set as a separate system base in the memory of the microcomputer of the control unit 100.

The thermal environment determining means 102 discriminates the present operating state of the air conditioner system between six operational states comprising a rapid heating state $A_1$, a rapid cooling state $A_2$, a steady heating state $C_1$, a steady cooling state $C_2$, a transient heating state $B_1$ between the rapid heating state $A_1$ and steady heating state $C_1$, and a transient cooling state $B_2$ between the rapid cooling state $A_2$ and the steady cooling state $C_2$, on the basis of, for example, the difference $\pm \Delta T = T_{ic} - T_{set}$ ($\Delta T \geq 0$) between the detected cabin temperature $T_{ic}$ and the set cabin temperature $T_{set}$, for example, if first and second reference temperature differences $\pm \Delta T_1$ and $\pm \Delta T_2$ ($|\pm \Delta T_1| >> |\pm \Delta T_2|$) are set. The six operational states of the air conditioner system thermal environment determining means 102 are shown in Table 1.

TABLE 1

| STATE | REQUIREMENT | TEMP. DIFFERENCE |
|---|---|---|
| $A_1$ | $\|-\Delta T\| > \|-\Delta T_1\|$ | Large |
| $A_2$ | $+\Delta T > +\Delta T_1$ | Large |
| $B_1$ | $\|-\Delta T_1\| \geq \|-\Delta T\| \geq \|-\Delta T_2\|$ | Medium |
| $B_2$ | $+\Delta T_1 \geq +\Delta T \geq -\Delta T_2$ | Medium |
| $C_1$ | $\|-\Delta T\| < \|-\Delta T_2\|$ | Small |
| $C_2$ | $+\Delta T < +\Delta T_2$ | Small |

The active state modifying means 104 modifies the present active state of the air conditioner system which is set in the control unit 100, to a required state by adjustment of, for example, the blower voltage $V_{fan}$ applied to the blower motor which influences flow rate of the conditioned air, or the set cabin temperature $T_{set}$ which influences the required discharge air temperature, on the basis of the modification request $H_f$ indicative of "too hot" or "too cold" which was input at the modification request input means 130, and on the basis of the present active state of the air conditioner system determined by the thermal environment determining means 102.

The active state renewing means 106 rewrites or renews the blower voltage $V_{fan}$ or the set cabin temperature $T_{set}$ stored in the automatic operation setting program, according to the new, modified required condition thereof. When the required value of the blower voltage $V_{fan}$ or the set cabin temperature $T_{set}$ affecting the thermal environment is modified by means of the active condition modifying means 104.

The first preferred embodiment of the operation of the air conditioner system, according to the present invention, is described below.

Figure 2:
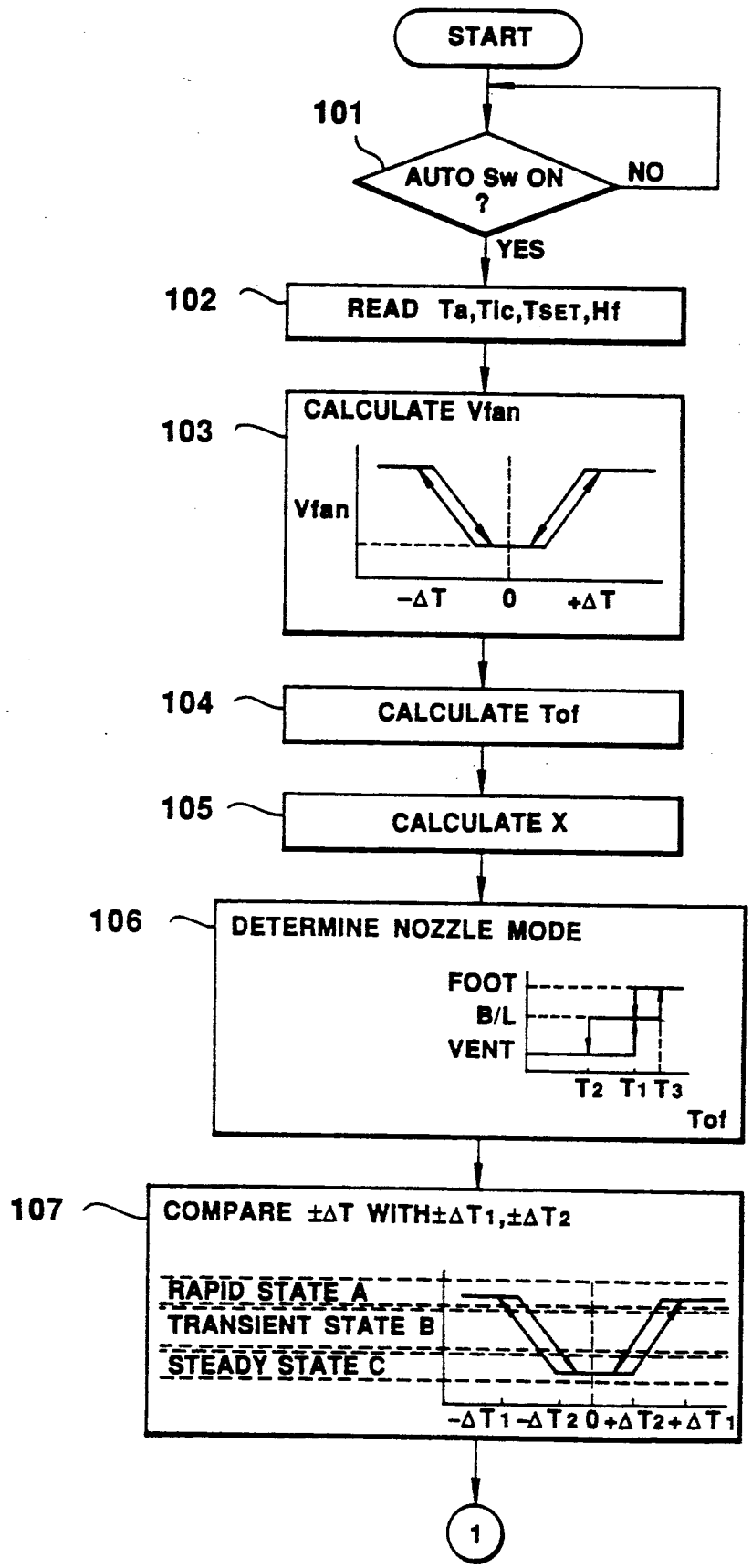

FIGS. 2 and 3 show the first preferred embodiment of control programs of the control unit 100 according to the present invention, in a case where the user causes the automatic operation setting switch 120 to be turned on.

In execution of the control program, it is monitored whether or not the automatic operation setting switch 120 has been turned on, at step 101. When the switch 120 is ON, the routine goes to step 102, and when it is OFF, the routine returns to step 101. It will be noted that when the automatic operation setting switch 120 has been turned on the system will default to the previously memorized active state of the air conditioner system.

At step 102, the detected cabin temperature $T_{ic}$, the ambient temperature $T_a$, the magnitude of insolation S and the set cabin temperature $T_{set}$, which are respectively output from the cabin temperature sensor 112, the ambient temperature sensor 114, the insolation sensor 116 and the cabin temperature setting unit 118 are temporarily stored in the sub-memory of the microcomputer of the control unit 100. In addition, if a modification request $H_f$ about the thermal environment output from the modification request input means 130 is present, it too is temporarily stored in the sub-memory.

At step 103, the difference $\pm \Delta T = T_{ic} - T_{set}$ between the detected cabin temperature $T_{ic}$ and the set cabin temperature $T_{set}$ is calculated. In addition, on the basis of the difference $\pm \Delta T$, the blower voltage $V_{fan}$ is determined from a predetermined relationship between the temperature difference $\pm \Delta T$ and the blower voltage $V_{fan}$, and the determined blower voltage $V_{fan}$ is temporarily stored in the sub-memory of the microcomputer of the control unit 100. Since rapid cooling or heating must be performed when the difference $\pm \Delta T$ is great, the blower voltage $V_{fan}$ is set to be relatively high when the system is initially operated. As the absolute value of the difference $\pm \Delta T$ decreases, the voltage decreases.

At step 104, the required discharge air temperature $T_{of}$ is calculated from the ambient temperature $T_a$, the detected cabin temperature $T_{ic}$, the set cabin temperature $T_{set}$ and the insolation S, in accordance with the following equation.

$$T_{of} = A \times T_a + B \times T_{ic} + C \times T_{set} + D \times S + E$$

in which A, B, C, D and E are constants. The result is temporarily stored in the sub-memory of the microcomputer.

At step 105, on the basis of the required discharge air temperature $T_{of}$ calculated at the step 104, the opening angle X of the air-mix door 34 is calculated in accordance with the following equation.

$$X = F \times T_{of}^2 + G \times T_{of} + H$$

in which F, G and H are constants. The result is temporarily stored in the sub-memory of the microcomputer.

At step 106, on the basis of the required discharge air temperature $T_{of}$ calculated at the step 104, the discharge nozzle mode is determined from a predetermined relationship between the required discharge air temperature and the discharge nozzle mode. At step 106, until the required discharge air temperature $T_{of}$ decreases to the temperature $T_1$, the operation mode is set to be FOOT mode in which only the foot nozzle 58 is open. Thereafter, while the required discharge air temperature $T_{of}$ further decreases to the temperature $T_2$, the operation mode is set to the BI-LEVEL (B/L) mode in which both the vent and foot nozzles 52 and 58 are open. If the required discharge air temperature $T_{of}$ further decreases to be less than the temperature $T_2$, the operation mode is set to the VENT mode in which only the vent nozzle 52 is open. On the other hand, until the required discharge air temperature $T_{of}$ increases to the temperature $T_1$, the operation mode is set to be the VENT mode. Thereafter, while the required discharge air temperature $T_{of}$ further increases to the temperature $T_3$, the operation mode is set to the BI-LEVEL mode. If the required discharge air Temperature $T_{of}$ further increases to be greater than the temperature $T_3$, the operation mode is set to the FOOT mode.

Then, the routine goes from step 106 to step 107 in which the temperature difference $\pm \Delta T$ calculated at step 103 is compared with the first and second reference temperature differences $\pm \Delta T_1$ and $\pm \Delta T_2$ of the thermal environment determining means 102.

Thereafter, the routine goes to step 108 in which, on the basis of the result of step 107, the required operating state of the air conditioner system is discriminated between rapid state A, the transient state B and the steady state C in accordance with the relationship between the temperature difference $\pm \Delta T$ and the operating state, as shown in step 107 or in Table 1. When the operating state of the air conditioner system is determined as rapid state A, the routine goes to step 109. When it is the transient state B, the routine goes to step 110. When it is the steady state C, the routine goes to step 111.

At steps 109, 110 and 111, it is determined whether or not a modification request $H_f$ for adjusting the thermal environment has been input when the air conditioner system operates in each respective state, i.e. the rapid state A, the transient state B, or the steady state C. If a user modification request $H_f$ has been input, it is also determined which modification request $H_f$ has been input, a request $H_{f-1}$ indicative of "too hot" or the request $H_{f-2}$ indicative of "too cold".

At step 109, it is determined whether or not the user modification request $H_f$ has been input when the operating state of the air conditioner system is the rapid state A. If no modification request $H_f$ has been input by the user, the routine goes to step 136. If the modification request $H_{f-2}$ indicative of "too cold" has been input, the routine goes to step 112, and if the modification request $H_{f-1}$ indicative of "too hot" has been input, the routine goes to step 113.

At step 110, it is determined whether or not a modification request $H_f$ has been input while the operating state of the air conditioner system is the transient state B. If no modification request $H_f$ has been input, the routine goes to step 136. If the modification request $H_{f-2}$ indicative of "too cold" has been input, the routine goes to step 114, and if the modification request $H_{f-1}$ indicative of "too hot" has been input, the routine goes to step 115.

At step 111, it is determined whether or not a modification request $H_f$ has been input while the operating state of the air conditioner system is the steady state C. If no modification request $H_f$ has been input, the routine goes to step 136. If the modification request $H_{f-2}$ indicative of "too cold" has been input, the routine goes to step 116, and If the modification request $H_{f-1}$ indicative of "too hot" has been input, the routine goes to step 117.

At steps 112 to 117, the operating state of the air conditioner system is determined as being the heating or cooling state.

At step 112, while the air conditioner system is operating in the rapid state A, when the modification request $H_{f-2}$ indicative of "too cold" has been input, it is determined whether or not the difference $\Delta T$ has a positive sign, i.e. whether or not the modified cabin temperature $T_{ic}$ is greater than the set cabin temperature $T_{set}$. At step 112, the difference $\Delta T$ having a negative sign indicates that the air conditioner system is set in the rapid heating state $A_1$ in which the vehicular cabin is rapidly heated by the system in accordance with steps 103 and 104, such as the initial operating state of the air conditioner system in winter, since the set cabin temperature $T_{set}$ is much greater than the detected cabin temperature $T_{ic}$. In this case, since the rapid heating state $A_1$ is combined with the modification request $H_{f-2}$ indicative of "too cold" determined in step 109, the required operating state of the air conditioner system determined by the required blower voltage $V_{fan}$ and the required discharge air temperature $T_{of}$, which was set at steps 103 and 104, is not modified, and the routine goes to step 136. On the other hand, the difference $\Delta T$ having a positive sign indicates that the air conditioner system is set in the rapid cooling state $A_2$ in which the vehicular cabin is rapidly cooled by the system in accordance with steps 103 and 104, such as the initial operating state of the air conditioner system in summer, since the set cabin temperature $T_{set}$ is much less than the detected cabin temperature $T_{ic}$. In this case, since the rapid cooling state $A_2$ is combined with the modification request $H_{f-2}$ indicative of "too cold" determined in step 109, the routine goes step 118 in order to modify the operating state of the air conditioner system to the required operating state.

At step 113, it is determined whether or not the difference $\Delta T$ has a positive sign in a case where the modification request $H_{f-1}$ indicative of "too hot" has been input while the air conditioner system operates in the rapid state A. At step 113, the difference $\Delta T$ having a negative sign indicates that the air conditioner system is set in the rapid heating state $A_1$ in which the vehicular cabin is rapidly heated by the system in accordance with steps 103 and 104, such as the initial operating state of the air conditioner system in winter, since the set cabin temperature $T_{set}$ is much greater than the detected cabin temperature $T_{ic}$. In this case, since the rapid heating state $A_1$ is combined with the modification request $H_{f-1}$ indicative of "too hot" determined in step 109, the routine goes to step 118 in order to modify the required operating state of the air conditioner system. On the other hand, the difference $\Delta T$ having a positive sign indicates that the air conditioner system is set in the rapid cooling state $A_2$ in which the vehicular cabin is rapidly cooled by the system in accordance with steps 103 and 104, such as the initial operating state of the air conditioner system in summer, since the set cabin temperature $T_{set}$ is much less than the detected cabin temperature $T_{ic}$. In this case, since the rapid cooling state $A_2$ is combined with the modification request $H_{f-1}$ indicative of "too hot" determined in step 109, the required operating state of the air conditioner system, which was set at steps 103 and 104, is not modified, and the routine goes to step 136.

At step 114, it is determined whether or not the difference $\Delta T$ has a positive sign in a case where the modification request $H_{f-2}$ indicative of "too cold" has been input while the air conditioner system operates in the transient state B. At step 114, the difference $\Delta T$ having a negative sign indicates that the air conditioner system is set in the transient heating state $B_1$ in which the system tends to gently heat the vehicular cabin in accordance with steps 103 and 104, such as the operating state of the air conditioner in a short time after the system starts to drive in winter, since the set cabin temperature $T_{set}$ is greater than the detected cabin temperature $T_{ic}$ in some degree. In this case, since the modification request $H_{f-2}$ indicative of "too cold" has been input although it takes a short time after the system starts to heat the vehicular cabin, the routine goes to step 119 in order to modify the required operating state of the air conditioner system which was set at steps 103 and 104. On the other hand, the difference $\Delta T$ having a positive sign indicates that the air conditioner system is set in the transient cooling state $B_2$ in which the system tends to gently cool the vehicular cabin in accordance with steps 103 and 104, such as the operating state of the air conditioner system in a short time after the system starts to drive in summer, since the set cabin temperature $T_{set}$ is less than the detected cabin temperature $T_{ic}$ in some degree. In this case, since the modification request $H_{f-2}$ indicative of "too cold" has been input a short time after the system starts to cool the vehicular cabin, the routine goes to step 120 in order to modify the required operating state of the air conditioner system which was set at steps at 103 and 104.

At step 115, it is determined whether or not the difference $\Delta T$ has a positive sign in a case where the modification request $H_{f-1}$ indicative of "too hot" has been input while the air conditioner system operates in the transient state B. At step 115, the difference $\Delta T$ having a negative sign indicates that the air conditioner system is set in the transient heating state $B_1$ in which the system tends to gently heat the vehicular cabin in accordance with steps 103 and 104, such as the operating state of the air conditioner system a short time after the system starts to drive in winter, since the set cabin temperature $T_{set}$ is greater than the detected cabin temperature $T_{ic}$ in some degree. In this case, since the modification request $H_{f-1}$ indicative of "too hot" has been input a short time after the system starts to heat the vehicular cabin, the routine goes to step 121 in order to modify the required operating state of the air conditioner system which was set at steps 103 and 104. On the other hand, the difference $\Delta T$ having a positive sign indicates that the air conditioner system is set in the transient cooling state $B_2$ in which the system tends to gently cool the vehicular cabin in accordance with steps 103 and 104, such as the operating state of the air conditioner system a short time after the system starts to drive in summer, since the set cabin temperature $T_{set}$ is less than the detected cabin temperature $T_{ic}$ in some degree. In this case, since the modification request $H_{f-1}$ indicative of "too hot" has been input a short time after the system starts to cool the vehicular cabin, the routine goes to step 122 in order to modify the required operating state of the air conditioner system which was set at steps at 103 and 104.

At step 116, it is determined whether or not the difference $\Delta T$ has a positive sign in a case where the modification request $H_{f-2}$ indicative of "too cold" has been input while the air conditioner system operates in the steady state C. At step 116, the difference $\Delta T$ having a negative sign indicates that the air conditioner system is set in the steady heating state $C_1$ in which the system tends to weakly heat the vehicular cabin to maintain a required thermal environment in accordance with steps 103 and 104, such as the operating state of the air conditioner system a sufficient time after the system starts to drive in winter, since the set cabin temperature $T_{set}$ is very slightly greater than the detected cabin temperature $T_{ic}$. In this case, since the modification request $H_{f-2}$ indicative of "too cold" has been input although the system heats sufficiently the vehicular cabin, the routine goes to step 123 in order to modify the required operating state of the air conditioner system which was set at steps 103 and 104. On the other hand, the difference $\Delta T$ having a positive sign indicates that the air conditioner system is set in the steady cooling state $C_2$ in which the system tends to weakly cool the vehicular cabin to maintain its required thermal environment in accordance with steps 103 and 104, such as the operating state of the air conditioner system in a sufficient time after the system starts to drive in summer, since the set cabin temperature $T_{set}$ is very slightly less than the detected cabin temperature $T_{ic}$. In this case, since the modification request $H_{f-2}$ indicative of "too cold" has been input when the system sufficiently cools the vehicular cabin, the routine goes to step 124 in order to modify the required operation state of the air conditioner system which was set at steps at 103 and 104.

At step 117, it is determined whether or not the difference $\Delta T$ has a positive sign in a case where the modification request $H_{f-1}$ indicative of "too hot" has been input while the air conditioner system operates in the steady state C. At step 116, the difference $\Delta T$ having a negative sign indicates that the air conditioner system is set in the steady heating state $C_1$ in which the system tends to weakly heat the vehicular cabin to maintain a required thermal environment in accordance with steps 103 and 104, such as the operating state of the air conditioner system a sufficient time after the system starts to drive in winter, since the set cabin temperature $T_{set}$ is very slightly greater than the detected cabin temperature $T_{ic}$. In this case, since the modification request $H_{f-1}$ indicative of "too hot" has been input when the system has sufficiently heated the vehicular cabin, the routine goes to step 125 in order to modify the required operation state of the air conditioner system which was set at steps 103 and 104. On the other hand, the difference $\Delta T$ having a positive sign indicates that the air conditioner system is set in the steady cooling state $C_2$ in which the system tends to weakly cool the vehicular cabin to maintain its required thermal environment in accordance with steps 103 and 104, such as the operating state of the air conditioner system a sufficient time after the system starts to drive in summer, since the set cabin temperature $T_{set}$ is very slightly less than the detected cabin temperature $T_{ic}$. In this case, since the modification request $H_{f-1}$ indicative of "too hot" has been input although the system has sufficiently cooled the vehicular cabin, the routine goes to step 126 in order to modify the required operating state of the air conditioner system which was set at steps at 103 and 104.

At steps 118 to 132, the thermal environment is modified according to the required operating state of the air conditioner system.

At step 118, the required thermal environment condition is modified in a case where the cooling or heating cycle of the air conditioner system is not sufficiently fulfilling its function when initially activated, since the user felt cold immediately after the system started to cool the vehicular cabin, or the user felt hot immediately after it started to heat the latter. At this step, the voltage $V_{fan}$ applied to the blower motor only is caused to decrease by two ranks, for example, $0.5V \times 2 = 1.0V$, and the routine goes step 128.

At step 119, modification in response to the modification request $H_{f-2}$ indicative of "too cold" in the transient heating state $B_1$ is performed. At this step, both of the blower voltage $V_{fan}$ and the set cabin temperature $T_{set}$ are caused to increase by one rank, for example, 0.5V and 0.5° C., respectively, and the routine goes to step 128.

At step 120, modification corresponding to the modification request $H_{f-2}$ indicative of "too cold" in the transient cooling state $B_2$ is performed. At this step, the blower voltage $V_{fan}$ is caused to decrease by one rank, for example 0.5V, and the set cabin temperature $T_{set}$ is caused increase by one rank, for example, 0.5° C., and the routine goes to step 128.

At step 121, modification corresponding to the modification request $H_{f-1}$ indicative of "too hot" in the transient heating state $B_1$ is performed. At this step, both of the blower voltage $V_{fan}$ and the set cabin temperature $T_{set}$ are caused to decrease by one rank, for example, 0.5V and 0.5° C., respectively, and the routine goes to step 128.

At step 122, modification corresponding to the modification request $H_{f-1}$ indicative of "too hot" in the transient cooling state $B_2$ is performed. At this step, the blower voltage $V_{fan}$ is caused to increase by one rank, for example, 0.5V, and the set cabin temperature $T_{set}$ is caused to decrease by one rank, for example, 0.5° C., and the routine goes to step 128.

At step 123, modification corresponding to the modification request $H_{f-2}$ indicative of "too cold" in the steady heating state $C_1$ is performed. At this step, both of the blower voltage $V_{fan}$ and the set cabin temperature $T_{set}$ are caused to increase by one rank, for example, 0.5V and 0.5° C. respectively, and the routine goes to step 127.

At step 124, modification corresponding to the modification request $H_{f-2}$ indicative of "too cold" in the steady cooling state $C_2$ is performed. At this step, the blower voltage $V_{fan}$ is caused to decrease by one rank, for example, 0.5V, and the set cabin temperature $T_{set}$ is caused to increase by one rank, for example, 0.5° C., and the routine goes to step 127.

At step 125, modification corresponding to the modification request $H_{f-1}$ indicative of "too hot" in the steady heating state $C_1$ is performed. At this step, similar to step 121, both of the blower voltage $V_{fan}$ and the set cabin temperature $T_{set}$ are caused to decrease by one rank, for example. 0.5V and 0.5° C., respectively, and the routine goes to step 127.

At step 126, modification corresponding to the modification request $H_{f-1}$ indicative of "too hot" in the steady cooling state $C_2$ is performed. At this step, similar to step 122, the blower voltage $V_{fan}$ is caused to increase by one rank, for example, 0.5V, and the set cabin temperature $T_{set}$ is caused to decrease by one rank, for example, 0.5° C., and the routine goes to step 127.

At step 127, the blower voltage $V_{fan}$ modified at respective steps 123, 124, 125 and 125 returns the value calculated at step 103, after a predetermined time, for example, after 1 minute, by means of a timer (not shown) within the microcomputer of the control unit 100. Thereafter, the routine goes step 128.

At step 128, it is determined whether or not the values of the blower voltage $V_{fan}$ modified at respective steps 118 to 126 are within a predetermined range ($V_M$ range), respectively. If the modification value $V_M$ is within the $V_M$ range, the routine goes to step 130, and if its beyond the $V_M$ range, the routine goes to step 129.

At step 129, the modification value of the blower voltage $V_{fan}$ is caused to be limited to the $V_M$ range. For example, if the $V_M$ range is set as ±2V, the actual modification value is caused to be limited to ±2V when the value $V_M$ modified at respective steps 118 to 126 is beyond the $V_M$ range of ±2V.

At step 130, it is determined whether or not the modification values of the set cabin temperatures $T_{set}$ modified at respective steps 119 to 126 are within predetermined range ($T_M$ range), respectively. If the modification value $T_M$ is within the $T_M$ range, the routine goes to step 132, and if its beyond the $T_M$ range, the routine goes to step 131.

At step 131, the modification value $T_M$ of the set cabin temperature $T_{set}$ is caused to be limited to the predetermined range ($T_M$ range). For example, if the $T_M$ range is set as ±3° C., the actual modification value $T_M$ is caused to be limited to 3° when the value $T_M$ modified at respective steps 119 to 126 is beyond the $T_M$ range of ±3° C.

At step 132, the present modification values $V_M$ and $T_M$ of the blower voltage $V_{fan}$ and the set cabin temperature $T_{set}$ are calculated.

At step 133, it is determined whether or not the present modification values $V_M$ and $T_M$ are equal to the immediately preceding modification values $V_M$ and $T_M$. If they are same, the routine goes to step 135, and if there is a difference therebetween, the routine goes to step 134.

At step 134, the modification values $V_M$ and $T_M$ of the blower voltage $V_{fan}$ and the set cabin temperature $T_{set}$ are rewritten or renewed by new values $V_M$ and $T_M$ in the automatic operation setting program.

At step 135, the set cabin temperature $T_{set}$ which was read at step 102 and the blower voltage $V_{fan}$ which was calculated at step 103 are modified in accordance with the modification values $V_M$ and $T_M$ set at steps 118 to 126, and then the routine goes to step 136.

At step 136, electrical power corresponding to the calculated blower voltage $V_{fan}$ is supplied to the blower motor 28, so that the blower motor 28 is driven. Thereafter, the routine goes to step 137.

At step 137, electrical powers corresponding to the opening angle of the air-mix door 34 calculated at step 105, and to the discharge nozzle mode determined at step 106 are supplied the actuators 38, 66, 68 and 70, so that the air-mix door 34, the defroster door 60, the ventilator door 62 and the foot door 64 are positioned at positions calculated and determined at steps 105 and 106.

The aforementioned processes at steps 102 to 137 are cyclically repeated while the automatic operation setting switch 120 is turned on.

As mentioned above, according to the present invention, if the user inputs a modification request indicative of "too hot" in the rapid cooling state $A_2$ of the air conditioner system in which the detected cabin temperature $T_{ic}$ is much greater than the set cabin temperature $T_{set}$, or if the user inputs a modification request indicative of "too cold" in the rapid heating state $A_1$ thereof in which the detected cabin temperature $T_{ic}$ is much less than the set cabin temperature $T_{set}$, then both of the blower voltage $V_{fan}$ (flow rate) and the set cabin temperature $T_{set}$ are not modified. However, if the user inputs a modification request indicative of "too cold" in the rapid cooling state $A_2$, or if the user inputs a modification request indicative of "too hot" in the rapid heating state $A_1$, or if the user inputs a modification request indicative of "too hot" or "too cold" in the transient heating or cooling state $B_1$ or $B_2$ in which the difference $\Delta T$ between the detected cabin temperature $T_{ic}$ and the set cabin temperature $T_{set}$ is relatively small, or in the steady heating or cooling state $C_1$ or $C_2$ in which the difference $\Delta T$ is very small, then the flow rate of the discharge conditioned air (the blower voltage $V_{fan}$) and/or the set cabin temperature $T_{set}$ are modified in accordance with the operating state of the air conditioner system and the modification request, so that comfortable air conditioning can be easily achieved. Furthermore, in a case where the air conditioner system operates in the steady state, i.e. the difference $\Delta T$ is very small, then the cabin temperature does not immediately change if the set cabin temperature $T_{set}$ changes. Therefore, in this case, the blower voltage $V_{fan}$, i.e. the flow rate of the discharge conditioned air is caused to temporarily change in order to assist the temperature modification to minimize delay in achieving the required thermal environment.

Referring to FIGS. 4 to 6, the second preferred embodiment of an air conditioner system, according to the present invention, is described below.

This embodiment is characterized in that the user can input a modification request $H_f$ for adjusting the flow rate of discharged conditioned air, as a modification request for adjusting the thermal environment. That is, in this embodiment, the control unit 100 is electrically connected to a modification request input means 150 as shown in FIG. 4, which is installed in the aforementioned operation panel (not shown). The modification request input means 150 comprises self-resetting type button switches 151 and 152. The self-resetting button switch 151 serves to declare a modification request $H_{f\cdot3}$ indicative of "too strong" for adjusting the flow rate of discharge conditioned air when the user feels the flow rate is too strong, and the self-resetting button switch 152 serves to declare a modification request $H_{f\cdot4}$ indicative of "too weak" for adjusting the flow rate of discharge conditioned air when the user feels the flow rate is too weak. When the user pushes the button switch 151 while the automatic operation of the air conditioner system is performed, an electrical signal corresponding to the modification request $H_{f\cdot3}$ indicative of "too strong" is output to the control unit 100. On the other hand, when the user pushes the button switch 152, an electrical signal corresponding to the modification request $H_{f\cdot4}$ indicative of "too weak" is output to the control unit 100.

The operation of the second preferred embodiment of an air conditioner system, according to the present invention, is described below.

FIGS. 5 and 6 show the second preferred embodiment of a program which controls the control unit 100. Steps 201 to 208 are same as the corresponding steps 101 to 108 in FIG. 2, respectively.

At step 208, after the operating state of the air conditioner system is determined, the routine goes to one of steps 209 to 211 which are the rapid state A, the transient state B and the steady state C, respectively.

At steps 209 to 211, it is determined whether or not a modification request $H_f$ for adjusting the flow rate of discharged conditioned air has been input, while the air conditioner system operates in one of the respective states, i.e. the rapid state A, the transient state B, or the steady state C. At these steps, it is also determined which modification request $H_f$ has been input, the modification request $H_{f\cdot3}$ indicative of "too strong" or the modification request $H_{f\cdot4}$ indicative of "too weak".

At step 209, it is determined whether or not a modification request $H_f$ has been input, and which modification request $H_f$ has been input, while the air conditioner system operates in the rapid state A. If no modification request $H_f$ has been input, or if the modification request $H_{f\cdot4}$ indicative of "too weak" has been input, the routine goes to step 223 so that the blower voltage $V_{fan}$ is not modified. If the modifications request $H_{f\cdot3}$ indicative of "too strong" has been input, the routine goes to step 212. The blower voltage $V_{fan}$ is not modified in the case of the modification request $H_{f\cdot4}$ indicative of "too weak" for the reason that the flow rate of discharge conditioned air depending upon the blower voltage $V_{fan}$ determined by step 203 is maximum so that the flow rate can not further increase.

At step 210, it is determined whether or not a modification request $H_f$ has been input, and which modification request $H_f$ has been input, while the air conditioner system operates in the transient state B. If no modification request $H_f$ has been input, the routine goes to step 223. If the modification request $H_{f\cdot3}$ indicative of "too strong" has been input, the routine goes to step 213, and if the modification request $H_{f\cdot4}$ indicative of "too weak" has been input, the routine goes to step 214.

At step 211, it is determined whether or not a modification request $H_f$ has been input, and which modification request $H_f$ has been input, while the air conditioner system operates in the steady state C. If no modification request $H_f$ has been input, the routine goes to step 223. If the modification request $H_{f\cdot3}$ indicative of "too strong" has been input, the routine goes to step 215, and If the modification request $H_{f\cdot4}$ indicative of "too weak" has been input, the routine goes to step 216.

At steps 212 to 219, the required blower voltage $V_{fan}$ calculated at step 203 is modified.

At step 212, the flow rate of discharge conditioned air is modified in response to the modification request $H_{f\cdot3}$ indicative of "too strong" for adjusting the flow rate while the air conditioner system operates in the rapid state A. That is, at this step, the flow rate is caused to decrease by three ranks by decreasing the blower voltage $V_{fan}$ by, for example, 1.5V, and the routine goes step 217.

At step 213, the flow rate of discharge conditioned air is modified in response to the modification request $H_{f\cdot3}$ indicative of "too strong" for adjusting the flow rate while the air conditioner system operates in the transient state B. That is, at this step, the flow rate is caused to decrease by two ranks by decreasing the blower voltage $V_{fan}$ by, for example, 1.0V, and the routine goes to step 217.

At step 214, the flow rate of discharged conditioned air is modified in response to the modification request $H_{f}4$ indicative of "too weak" for adjusting the flow rate while the air conditioner system operates in the transient state B. That is, at this step, the flow rate is caused to increase by two ranks by increasing the blower voltage $V_{fan}$ by, for example, 1.0V, and the routine goes to step 217.

At step 215, the flow rate of discharged conditioned air is modified in response to &he modification request $H_{f\cdot3}$ indicative of "too strong" for adjusting the flow rate while the air conditioner system operates in the steady state C. That is, at this step, the flow rate is caused to decrease by one rank by decreasing the blower voltage $V_{fan}$ by, for example, 0.5V, and the routine goes to step 217.

At step 216, the flow rate of discharge conditioned air is modified in response to the modification request $H_{f\cdot4}$ indicative of "too weak" for adjusting the flow rate while the air conditioner system operates in the steady state C. That is, at this step, the flow rate is caused to increase by one rank by increasing the blower voltage $V_{fan}$ by, for example, 0.5V, and the routine goes to step 217.

Steps 217 to 224 are respectively same as steps 128, 129, and 132 to 137 in FIG. 3 except that processes with respect to the set cabin temperature $T_{set}$ are not performed.

Figure 7:
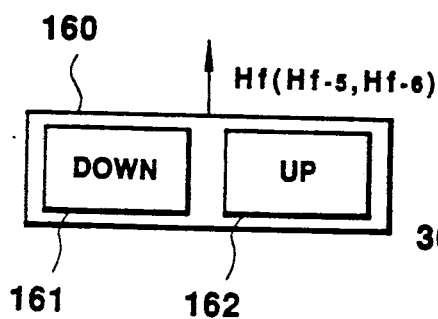
FIG. 7 is a schematic view of a request input means used for the third preferred embodiment of the air conditioner system of FIG. 1.

Now, referring to FIGS. 7 to 9, a third preferred embodiment of an air conditioner system, according to the present invention, will be described.

This embodiment is characterized in that the user can modify the discharge nozzle mode while the air conditioner system operates in accordance with the automatic operation setting program. That is, in this embodiment, the control unit 100 is electrically connected to a discharge nozzle mode modification input means 160 as shown in FIG. 7, which is installed in the aforementioned operation panel (not shown). The discharge nozzle mode modification input means 160 comprises self-resetting type button switches 161 and 162. The self-resetting button switch 161 serves to input a modification request $H_{f\cdot5}$ for modifying the discharge nozzle mode so that the flow rate of the conditioning air discharged from the ventilator nozzle 52 decreases and the flow rate from the foot nozzle 58 increases. This request will be referred hereinafter to as a "down request". The self-resetting button switch 162 serves to declare a modification request $H_{f\cdot6}$ for modifying the discharge nozzle mode so that the flow rate of the conditioned air discharged from the ventilator nozzle 52 increases and the flow rate from the foot nozzle 58 decreases. This request will be referred hereinafter to as an "up request" When the user pushes the button switch 161 while the automatic operation of the air conditioning system is performed, an electrical signal corresponding to the "down request" $H_{f\cdot5}$ is output to the control unit 100. On the other hand, when the user pushes the button switch 162, an electrical signal corresponding to the user's "up request" $H_{f\cdot6}$ is output to the control unit 100.

The operation of the third preferred embodiment of an air conditioner system, according to the present invention, is described below.

Figure 8:
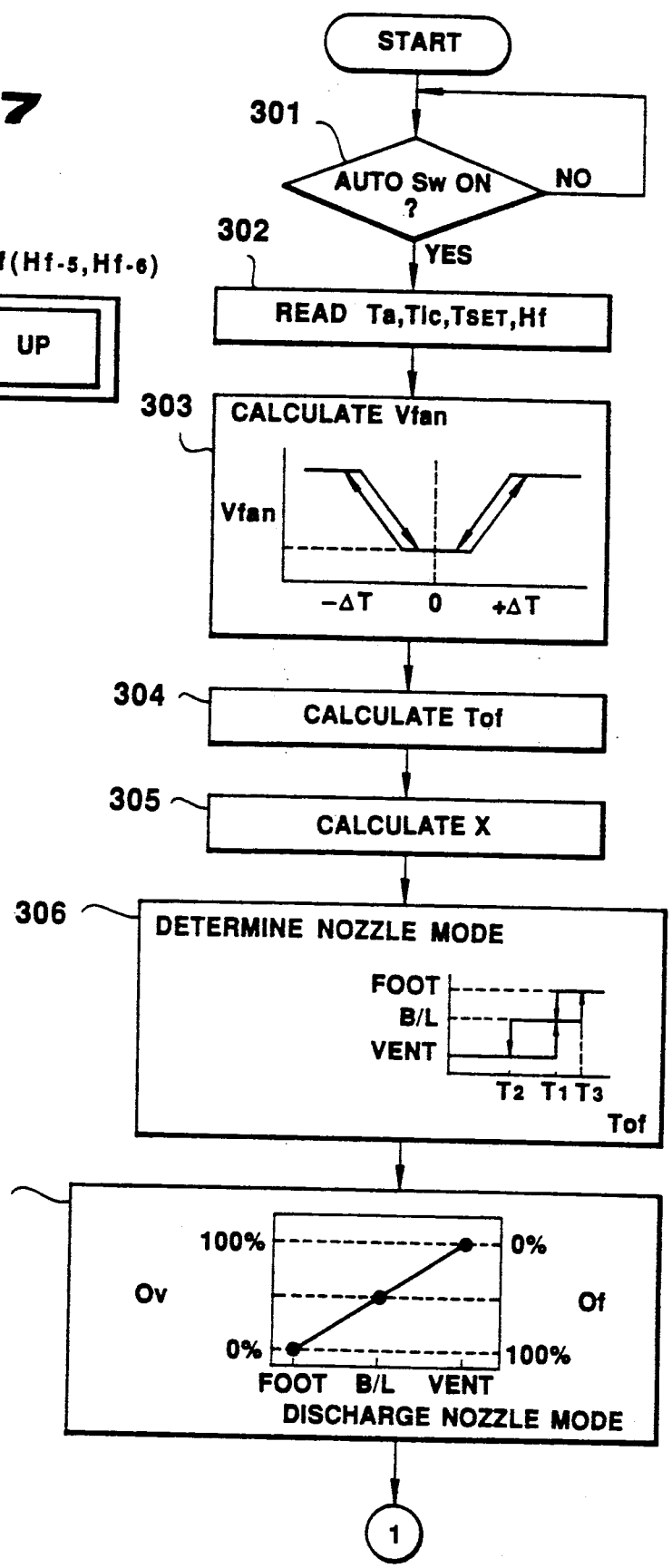
FIGS. 8 and 9 are flow charts showing the third preferred embodiment of a process for controlling the air conditioner system of FIG. 1.
Figure 9:
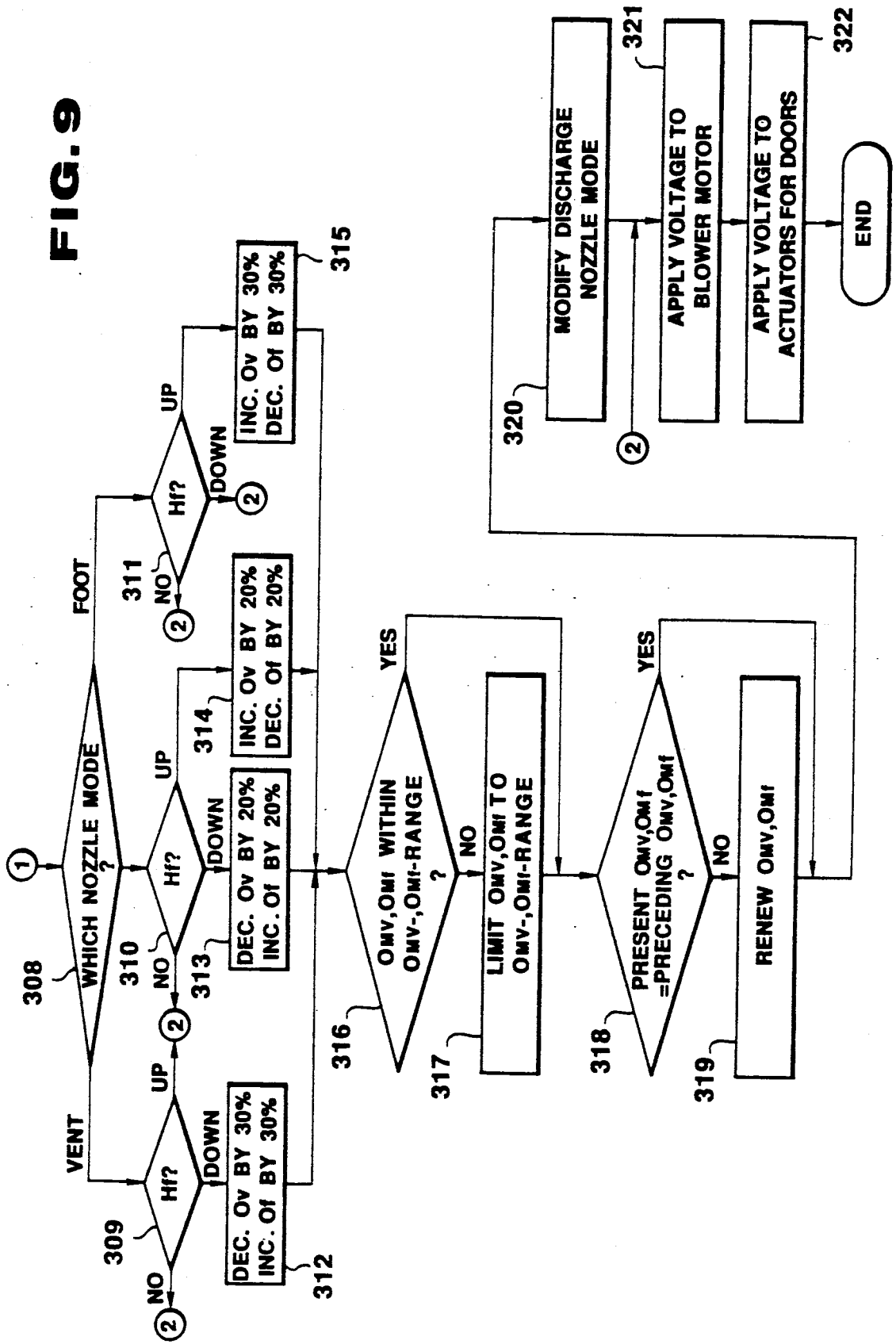

FIGS. 8 and 9 show the third preferred embodiment of a program which controls the control unit 100. Steps 301 to 306 are same as the corresponding steps 101 to 106 in FIG. 2, respectively.

At step 307, the opening angel percentage $O_v$ of the ventilator nozzle 52 and the opening angle percentage $O_f$ of the foot nozzle 58 are set on the basis of the discharge nozzle mode determined at step 306 such that the total opening angle percentages of these nozzles equals 100%. That is, as the flow rate of the conditioned air discharged from the ventilator nozzle 52 increases, the flow rate discharged from the foot nozzle 58 decreases. In the VENT mode, the opening angle percentage $O_v$ of the ventilator nozzle 52 is 100% and the opening angle percentage $O_f$ of the foot nozzle 58 is 0%. In the BI/LEVEL mode, both $O_v$ and $O_f$ are 50%. In the FOOT mode, the percentage $O_f$ is 100% and the percentage $O_v$ is 0%. This result is temporarily stored in the sub-memory of the microcomputer of the control unit 100. Thereafter, the routine goes to step 308.

At step 308, the present discharge nozzle mode of the air conditioner system determined at step 306 is discriminated between the VENT mode, the BI-LEVEL (B/L) mode and the FOOT mode. When the discharge nozzle mode is the VENT mode, the routine goes to step 309. When it is the B/L mode, the routine goes to step 310, and when it is the FOOT mode, the routine goes to step 311.

At steps 309 to 311, while the discharge nozzle mode is in one of the VENT mode, the B/L mode or the FOOT mode, respectively, it is determined whether or not the user has input a modification request for adjusting the discharge nozzle mode. If a modification request has been input, it is also determined which user request has been input, the "up request" or the "down request".

At step 309, if no user request has been input, or if an "up request" $H_{f\cdot6}$ has been input, the routine goes to step 321 so that the discharge nozzle mode is not modified. On the other hand, if a "down request" $H_{f\cdot5}$ has been input, the routine goes to step 312. The discharge nozzle mode determined at step 306 is not modified when an "up request" has been input for the reason that the percentage of the conditioned air discharged from the ventilator nozzle 52 is already at maximum, i.e. 100%, so it can not further increase.

At step 310, if no user request has been input, the routine goes to step 321. If a "down request" $H_f5$ has been input, the routine goes to step 313. On the other hand, if an "up request" has been input, the routine goes to step 314.

At step 311, if no modification request has been input, or if a "down request" $H_{f\cdot5}$ has been input by the user, the routine goes to step 321 so that the discharge nozzle mode is not modified. On the other hand, if the user's "up request" $H_{f\cdot6}$ has been input, the routine goes to step 315. The discharge nozzle mode determined at step 306 is not modified when a "down request" $H_{f\cdot5}$ is input for the reason that the percentage of the conditioned air discharged from the foot nozzle 58 is already maximum, i.e. 100%, so it can not further increase.

At steps 312 to 317, the discharge nozzle mode determined at step 306 is modified, i.e. the percentages $O_v$ and $O_f$ of opening angles of the ventilator nozzle 52 and the foot nozzle 58 are modified.

At step 312, in response to a "down request" $H_{f\cdot5}$ while the discharge nozzle mode of the air conditioner system is the VENT mode, it is determined that the percentage $O_v$ of opening angle of the ventilation nozzle 52 decreases by, for example, 30%, and the percentage $O_f$ of the opening angle of the foot nozzle 58 increases by, for example, 30%. Then, the routine goes to step 316.

At step 313, in response to the user's "down request" $H_{f.5}$ while the discharge nozzle mode is in the B/L mode, it is determined that the percentage $O_v$ decreases by, for example, 20% and the percentage $O_f$ increases by, for example, 20%, and then the routine goes to step 316.

At step 314, in response to the user's "up request" $H_{f.6}$ while the discharge nozzle mode is the B/L mode, it is determined that the percentage $O_v$ increases by, for example, 20% and the percentage $O_f$ decreases by 20%, and then the routine goes to step 316.

At step 315, in response to the user's "up request" $H_{f.6}$ while the discharge nozzle mode is the FOOT mode, it is determined that the percentage $O_v$ increases by, for example, 30% and the percentage $O_f$ decreases by 30%, and then the routine goes to step 316.

At step 316, it is determined whether or not the respective modification values of the percentages $O_v$ and $O_f$ modified at steps 312 to 315 are within predetermined ranges $O_{Mv}$ and $O_{Mf}$ ranges so as not to becomes greater than 100% or less than 0%. If the modification values $O_{Mv}$ and $O_{Mf}$ are within the $O_{Mv}$ and $O_{Mf}$ ranges, the routine goes to step 318, and if they are beyond the $O_{Mv}$ and $O_{Mf}$ ranges, the routine goes to step 317.

At step 317, the modification values $O_{Mv}$ and $O_{Mf}$ of the percentages $O_v$ and $O_f$ are limited to the $O_{Mv}$ and $O_{Mf}$ ranges. That is, if the modification values $O_{Mv}$ and $O_{Mf}$ of the percentage $O_v$ or $O_f$ are greater than 100%, they are adjusted to equal 100%, and if the modification value $O_{Mv}$ or $O_{Mf}$ of $O_v$ or $O_f$ are less than 0%, the are readjusted to equal 0%.

At step 318, it is determined whether or not the present modification values $O_{Mv}$ and $O_{Mf}$ of the percentages $O_v$ and $O_f$ are equal to the immediately preceding modification values $O_{Mv}$ and $O_{Mf}$. If they are same, the routine goes to step 320, and if there is a difference therebetween, the routine goes to step 319.

At step 319, the modification values $O_{Mv}$ and $O_{Mf}$ of the percentages $O_v$ and $O_f$ are rewritten or renewed by new values in the automatic operation setting program.

At step 320, the percentages $O_v$ and $O_f$ of the opening angles of the ventilator and foot nozzles 52 and 58 which were determined at step 307 are modified in accordance with the modification values $O_{Mv}$ and $O_{Mf}$ set at steps 312 to 315, and then the routine goes to step 321.

Steps 321 and 322 are respectively the same as steps 136 and 137 in FIG. 3.

Though the present invention has been described as an air conditioner system which can modify the blower voltage $V_{fan}$ and/or the set cabin temperature $T_{set}$, or the percentages $O_v$ and $O_f$ in response to a modification request for adjusting the cabin temperature or the flow rate of discharged conditioned air, or modification requests for adjusting the discharge nozzle mode, it should be appreciated that the air conditioner system of the invention can combine these modification. For example, "an energy saving switch" for decreasing power demands for driving a compressor, or a switch for turning the compressor on or off can be used as a switch for inputting the modification requests for adjusting the temperature or the flow rate of the discharge conditioned air, or the modification requests for adjusting the discharge nozzle mode. It will be noted that, although self resetting switches have been disclosed in the embodiments, the modification requests may alternatively be input by other suitable means, such as voice commands, a keypad, or the like.

In addition, an air conditioner system, according to the present invention, can be applied to a system which has front and rear discharge nozzles for front and rear seats. In this case, the user may input the aforementioned modifications for adjusting the conditioned air discharged from the rear discharge nozzle. Air conditioning operation for the front seat may be performed until the detected cabin temperature becomes a proper temperature, and then the air conditioning operation for preferrentially discharging the conditioned air to the rear seat may be performed depending upon modification requests after the detected cabin temperature becomes the proper temperature.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modification to shown embodiments which can be embodied without departing from the principle of the invention as set out in the appended claims.

What is claimed is:

1. An air conditioner system for an automotive vehicle comprising:

air passage means defining an air path and including an outlet which opens into a vehicular cabin for discharging conditioned air into said vehicular cabin;

air conditioning means for generating conditioned air of a desired temperature to be discharged into said vehicular cabin;

temperature setting means for allowing setting of a desired temperature of conditioned air within said vehicular cabin to produce a first signal representative of a set cabin temperature;

detecting means for monitoring thermal environment within and outside the vehicular cabin to produce a second signal representative of the detected thermal environment;

first control means, associated with said air conditioning means, for setting a target active state of the air conditioner system depending upon a relationship between said first and second signal values;

condition discriminating means for determining the present operative state of the air conditioner system on the basis of the relationship between said first and second signal values to produce a third signal representative of the present operative state;

input means for inputting a modification request for adjusting the thermal environment within said vehicular cabin to produce a fourth signal representative of the modification request; and second control means, associated with said first control means, for permitting modification of said target active state of the air conditioner system on the basis of a relationship between said third and fourth signal value.

2. An air conditioner system as set forth in claim 1, wherein said target active state set by said first control means includes a target flow rate of conditioned air.

3. An air conditioner system as set forth in claim 2, wherein said second control means modifies said target flow rate of conditioned air.

4. An air conditioner system as set forth in claim 3, wherein said second control means modifies the set cabin temperature.

5. An air conditioner system as set forth in claim 2, wherein said input means inputs a modification request for adjusting temperature within said vehicular cabin.

6. An air conditioner system as set forth in claim 5, wherein said control means modifies said target flow rate of conditioned air.

7. An air conditioner system as set forth in claim 6, wherein said second control means modifies the set cabin temperature.

8. An air conditioner system as set forth in claim 2, wherein said input means inputs a modification request for adjusting the flow rate of conditioned air.

9. An air conditioner system as set forth in claim 8, wherein said second means modifies said target flow rate of conditioned air.

10. An air conditioner system as set forth in claim 2, wherein said target active state set by said first control means includes the set cabin temperature of conditioned air to be discharged into said vehicular cabin.

11. An air conditioner system as set forth in claim 1, which further comprises memory means for storing a modification value for the operative state of the air conditioner system, and wherein said first control means adjusts the operative state thereof using said modification value.

12. An air conditioner system as set forth in claim 1, wherein said detecting means monitors temperature within said vehicular cabin, ambient temperature outside the vehicular cabin, and the magnitude of insolation to produce sensor signals representative of the detected cabin temperature, the ambient temperature and the magnitude of insolation, and wherein said first control means adjusts the flow rate of conditioned air on the basis of the difference between the detected cabin temperature and the set cabin temperature, and said condition discriminating means determines the present active state of the air conditioner system on the basis of said difference.

13. An air conditioner system for an automotive vehicle comprising:
air passage means defining an air path and including first and second outlets which open into a vehicular cabin for discharging conditioned air into said vehicular cabin;
air conditioning means for generating conditioned air of a desired temperature which is to be discharged into said vehicular cabin;
setting means for allowing setting of a desired temperature of the conditioned air within said vehicular cabin to produce a first signal representative of the set cabin temperature;
detecting means for monitoring thermal environment within and outside the vehicular cabin to produce a second signal representative of the detected thermal environment;
first control means, associated with said air conditioning means, for setting a target active state of the air conditioner system depending upon a relationship between the first and second signal values, said target active state including a target flow rate ratio of conditioned air discharged from said first air outlet to that from said second air outlet;
discriminating means for determining the present flow rate ratio of conditioned air on the basis of the relationship between the first and second signal values to produce a third signal representative of the present ratio of flow rate of conditioned air;
modification input means for allowing a modification request for modifying said target flow rate ratio of conditioned air to produce a fourth signal representative of the input modification request; and
second control means, associated with said first control means, for permitting modification of said target flow rate ratio of conditioned air on the basis of a relationship between said third and fourth signal values.

14. An air conditioner system as set forth in claim 13, wherein said target active state set by said first control means includes a target flow rate of conditioned air.

15. An air conditioner system as set forth in claim 14, wherein said discriminating means determines the present flow rate ratio of conditioned air on the basis of said discharge air temperature.

16. An air conditioner system as set forth in claim 13, which further comprises memory means for storing a modification value for the operative state of the air conditioner system, and wherein said first control means adjusts the operative state thereof by using said modification value.

17. An air conditioner system as set forth in claim 13, wherein said detecting means monitors temperature within said vehicular cabin, ambient temperature outside the vehicular cabin, and the magnitude of insolation to produce sensor signals representative of the detected cabin temperature, the ambient temperature and the magnitude of insolation, and wherein said first control means adjusts the flow rate of conditioned air on the basis of the difference between the detected cabin temperature and the set cabin temperature.

18. An air conditioner system as set forth in claim 1, wherein the present operative state determined by said condition discriminating means is selected from a rapid state, a transient state and a steady state.

19. An air conditioner system for an automotive vehicle comprising:
air passage means defining an air path and including an outlet which opens into a vehicular cabin for discharging conditioned air into said vehicular cabin;
air conditioning means for generating conditioned air of a desired temperature to be discharged into said vehicular cabin;
temperature setting means for allowing setting of a desired temperature of conditioned air within said vehicular cabin to produce a first signal representative of a set cabin temperature;
detecting means for monitoring thermal environment within and outside the vehicular cabin to produce a second signal representative of the detected thermal environment;
first control means, associated with said air conditioning means, for setting a target active state of the air conditioner system depending upon a relationship between said first and second signal values;
condition discriminating means for determining the present operative state of the air conditioner system from first and second operative states on the basis of the relationship between said first and second signal values to produce a third signal representative of the present operative state;

input means for inputting a modification request for adjusting the thermal environment within said vehicular cabin to produce a fourth signal representative of the modification request; and second control means, associated with said first control means, for modifying said target active state of the air conditioner system on the basis of the relationship between said third and fourth signal values, said second control means preventing said target active state from being modified when a corresponding predetermined modification request is input while said first operative state is selected as said present operative state.

20. An air conditioner system as set forth in claim 19, wherein said first operative state is either a rapid cooling state or a rapid heating state.

21. An air conditioner system as set forth in claim 20, wherein said modification request is either a first modification request indicative of a "too cold" condition for modifying said target active state so as to increase said set cabin temperature, or a second modification request indicative of a "too hot" condition for modifying said target active state so as to decrease said set cabin temperature.

22. An air conditioner system as set forth in claim 21, wherein said second control means prevents said target active state from being modified when said first modification request indicative of a "too cold" condition is input while said rapid heating state is selected as said present operative state, or when said second modification request indicative of a "too hot" condition is input while said rapid cooling state is selected as said present operative state.

23. An air conditioner system as set forth in claim 19, wherein said modification request is either a third modification request indicative of a "too weak" condition for modifying said target active state so as to increase a target air flow rate of conditioned air, or a fourth modification request indicative of a "too strong" condition for modifying said target active state so as to decrease said target air flow rate.

24. An air conditioner system as set forth in claim 23, wherein said second control means prevents said target active state from being modified when said third modification request indicative of a "too weak" condition is input while said first operative state is selected as said present operative state.

25. An air conditioner system as set forth in claim 24, wherein said first operative state is either a rapid cooling state or a rapid heating state.

* * * * *